United States Patent Office 3,106,979
Patented Oct. 15, 1963

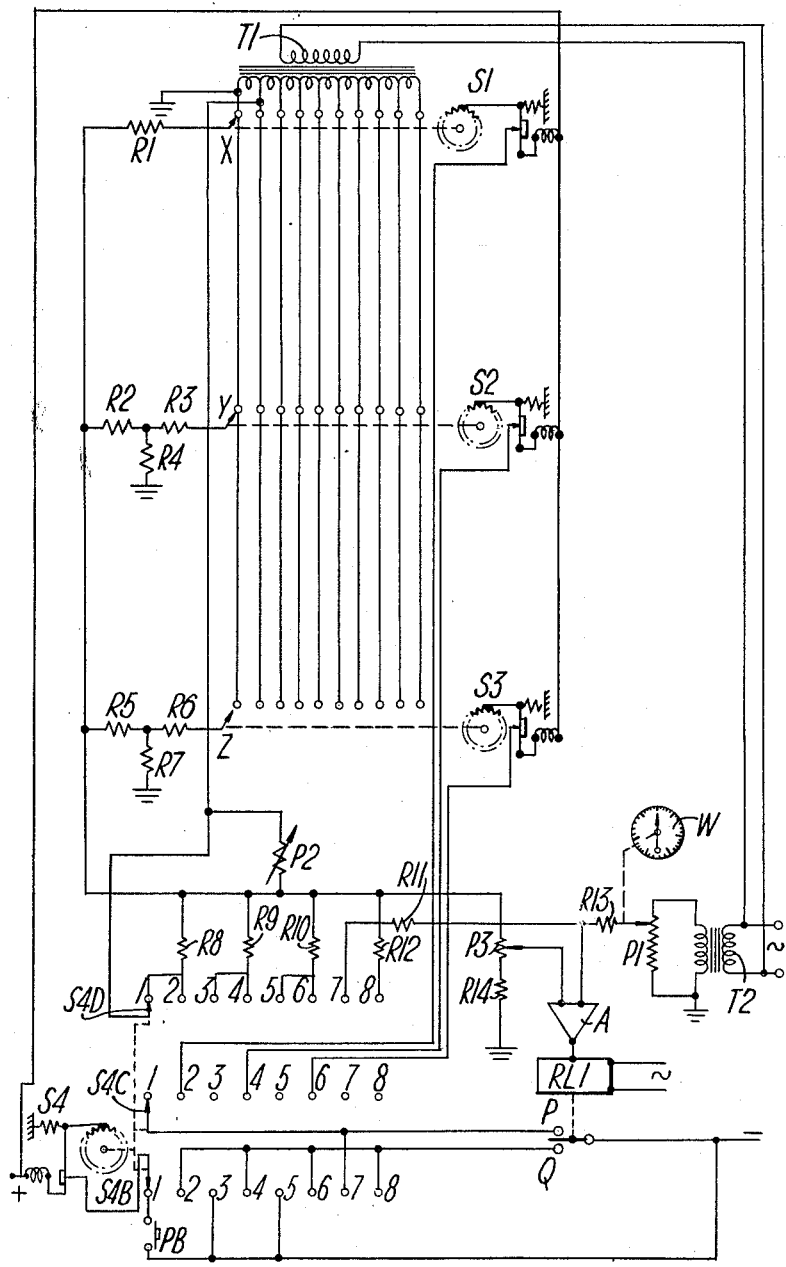

3,106,979
WEIGHING APPARATUS INCORPORATING A SELF-BALANCING POTENTIOMETER SYSTEM
John Moorhouse Chilton, Harborne, Birmingham, England, assignor to W. & T. Avery, Limited, Birmingham, England, a British company
Filed May 29, 1961, Ser. No. 113,236
5 Claims. (Cl. 177—210)

This invention relates to weighing apparatus incorporating a self-balancing potentiometer system of the kind wherein a voltage proportional to a load is compared with the output of means for producing counter voltage increments in each of several orders corresponding respectively with different units of weight of the load to be measured, and the error voltage derived from said comparison is employed to effect a control function such as for example to adjust automatically the counter voltage output to zero so that the resultant setting of said counter voltage productive means can afford an indication or measure in accordance with the load proportional voltage.

The present invention has for its primary object to provide in a system of the aforesaid kind improved means for providing the several orders of counter voltage increments.

The invention consists of weighing apparatus comprising means for producing a voltage proportional to a load, means for producing counter voltage increments in each of a plurality of orders of measurement corresponding respectively with different units of weight, amplifier means connected to compare said load proportionate voltage and counter voltage, and relay operated switch means connected to the output of said amplifier to effect a control function dependent on the result of said comparison, said counter voltage productive means comprising a transformer the secondary winding whereof has a plurality of tappings providing a plurality of equal voltage increments which tappings are directly connected to the fixed contacts of each of a plurality of stepping switches identified one with each of the plurality of orders of measurement, the moving contacts of the stepping switches being connected through attenuators to said amplifier so that the attenuators proportion the voltages derived from the moving contacts according to the relative values of the plurality of measurement orders.

Preferred means for carrying the invention into practice is described by way of example only with reference to the accompanying circuit diagram.

The system illustrated in the drawing comprises an analogue generator in the form of a potentiometer P1 the wiper whereof is mechanically coupled to the weight indicating spindle of a weighing machine W and is energised from the secondary winding of a transformer T2 so as to provide a voltage output proportional to a load imposed on the weighing apparatus. The circuit also includes a transformer T1 the secondary winding whereof has the number of tappings necessary to accommodate the order containing the largest number of increments to be measured, for example in an avoirdupois measuring system this would be twenty tappings corresponding with the hundredweights order of measurement. In the illustrated embodiment for the sake of simplicity ten tappings are shown constituting decade increments in a three decade order measuring system.

The several tappings of the transformer T1 are connected to the fixed contacts of three stepping switches S1, S2 and S3 which are adapted to traverse their respective moving contacts X, Y and Z so long as their driving coils are energised from the current supply, to constitute three balancing stages for a three order system of units.

The number of equal counter-balancing voltage increments furnished by each stage is determined by the setting of the moving contact X, Y and Z of the respective stepping switches S1, S2 and S3 and by the attenuator resistances R1–R7 in series with said moving contacts X, Y and Z. The attenuators are designed so that the incremental output voltage increase developed across the resistance R14 by each step of the stepping switch S2 is one tenth of that derived from each step of the stepping switch S1 whereas the incremental output voltage derived across R14 from each step of the stepping switch S3 is proportioned by the attenuator R5, R6 and R7 to equal one hundredth of that derived from each step of the stepping switch S1.

The sequence of operations of the stepping switches S1, S2 and S3 during a balancing cycle are controlled by a governing stepping switch S4 comprising three banks of contacts S4B, S4C and S4D wherein the contacts of bank S4C are connected to the energising coils of the stepping switches S1, S2 and S3 as shown, and the banks S4B and S4D are connected respectively to control the stepping of the switch S4 itself and to bias the comparison of the load counterbalancing voltages with the scale potentiometer P1 output voltage as hereinafter described.

The output voltages derived from the moving contact of the potentiometer P1 and from the added attenuated outputs taken from the moving contacts X, Y and Z of the three balancing stages are fed to a phase-conscious amplifier circuit A whose output controls a relay RL1 so that a phase reversal of the input signal to the amplifier circuit results in the actuation of the relay. The relay RL1 incorporates a moving contact co-operative with a pair of alternative fixed contacts P and Q. It will be appreciated that as the moving contacts X, Y or Z are adjusted from a position wherein their resultant voltage across R14 underbalances to a position wherein this voltage over-balances the output voltage from the scale potentiometer P1 so the output of the phase-conscious amplifier stage A will suffer a 180 degree phase reversal resulting in the actuation of the relay RL1 so that its moving contact is displaced from one to the other of the contacts P or Q. Suitable phase conscious amplifier circuits are well known and accordingly do not require detailed description in this specification.

The operation of the governing stepping switch S4 is controlled by the connection of the moving contact of its bank S4B through the energising coil of the switch S4 to the positive terminal of a D.C. power supply the negative terminal whereof is connected both to the moving contact of the relay RL1 and to the 1st, 3rd and 5th contacts of the contact bank B.

The governing stepping switch S4 controls the movement of the stepping switches S1, S2 and S3 by the connection of the moving contact of the bank S4C to one of the fixed contacts (P) of the relay RL1, the alternative fixed relay contact (Q) being connected to the 2nd, 4th, 6th and 8th contacts of the banks S4B, and the 2nd, 4th and 6th contacts of the bank S4C are connected to the energising coils of the stepping switches S1, S2 and S3 respectively. It will be appreciated that when the operation of the governing stepping switch S4 is initiated, by means of for example a push button switch PB1 in the connection of the power supply to the first terminal of the bank S4B, then the moving contact moves to the 2nd contact of this bank; simultaneously the moving contact of the bank C is traversed to the 2nd contact of its bank and assuming that the contact P of the relay RL1 is engaged, the stepping switch S1 is thereby energised so that its associated moving contact X is traversed across the tappings of the transformer T1 until the voltage across resistance R14 exceeds that from the potentiometer P1 whereby the output of the phase-conscious amplifier A is reversed in phase, thereby to change over the position of the moving contact with respect to the alternative contacts P and Q.

Since it is necessary that a higher order stage should be adjusted to over-balance the scale potentiometer P1 in order that a phase reversal can initiate changeover between the contacts P and Q it will be appreciated that the output from the stage must be subsequently reset to an under-balancing magnitude in order that a balance position may obtain in the lower order balancing stages. If for example the potentiometer P1 output voltage represents 560 units corresponding to the indication of the weighing indicator then the setting of the highest order balancing stage must give an output voltage across R14 representative of 600 units to result in the operation of the relay RL1, and must then be reset to give a voltage across R14 representative of 500 units to admit of the moving contact Y of the second balancing stage being set at a position representing 60 units. This operation of the circuit is achieved by means of the resistances R8, R9 and R10 which are connected as shown to the contacts of the bank S4D. The resistance R8 provides an additional voltage across R14 equal to one unit increment in the highest order balancing stage S1 which in the case of a three decade system will be representative of 100 units, and is connected in circuit by the governing stepping switch S4 through the first and second contacts of the contact bank E from the second tapping on the transformer T1 to the resistance R14 so that the output voltage derived from the highest order balancing stage is increased by 100 units with the result that in the above example, when the moving contact X is set at a position representative of 500 units then the voltage developed across the resistance R14 is representative of 600 units thereby to exceed the 560 units of voltage produced by the scale potentiometer P1 and so produce a changeover of the switch means PQ.

In order to produce a shift of the balance point in the second order balancing stage S2 by an amount equal to one unit increment in that stage so as to permit the balancing of the next lower order stage S3, the third and fourth contacts of the banks S4D serve to connect in circuit the resistance R9 providing across the resistance R14 a voltage representative of 10 units in addition to the voltage derived from contact Y of the tens decade S2. Thus when the tens decade contact Y reaches 60 units the voltage developed across resistance R14 represents 70 units of counter voltage which exceed the 60 units produced by the scale potentiometer P1 so as to secure a further changeover of the switch means PQ.

In a similar manner to that described above the resistance R10 is connected in circuit by the 5th and 6th contacts of the bank S4D so as to produce single unit addition to the voltage developed across R14 by the setting of the contact Z of the lowest order decade S3.

Subsequent to the operation of the stepping switch S1 of the hundreds decade and the resultant operation of the relay RL1 to engage the contact Q the 2nd contact of bank B is connected to the negative terminal of the D.C. supply whereby the moving contacts of banks B, C and D are progressed to the 3rd contacts of their banks. At this position the resistance R8 has been disconnected and the resistance R9 is introduced into the circuit so that the voltage across R14 again under-balances that from the potentiometer P1 to result in a phase reversal and the consequent operation of the relay RL1 to engage the contact P. Since the contact B is connected to the negative terminal of the D.C. supply the moving contacts of banks B, C and D are further traversed to engage the 4th contacts whereupon contact C4 is connected to the negative terminal of the D.C. supply to result in the stepping switch S2 being energized to effect the setting of the tens decade contact Y. Subsequent to the adjustment of the tens decade contact Y from an under-balanced to an over-balancing position the consequent phase reversal results in the engagement of contact Q. In a similar manner contacts B5 and B6 are sequentially engaged to effect the setting of the units decade contact Z. The stepping switches S1, S2 and S3 are thus automatically set in accordance with the indication of the weighing apparatus and this setting may be used to provide a corresponding digital representation for example by visual indicator means attached to the moving contacts X, Y or Z or by detection of the position of second moving contacts connected to the contacts X, Y and Z and sweeping over second contact banks thereby to operate a business machine.

It is desirable that apparatus of the aforesaid kind should incorporate means such that an incorrect reading cannot be obtained without the fault being known to the user of the equipment. To this end the contact banks B, C and D of the governing stepping switch S4 are provided with 7th and 8th contacts in each bank which are arranged to introduce resistances R11 and R12 into the network, these resistances being adapted to unbalance the network by one unit in one direction and then by one unit in the opposite direction so as to produce two opposite operations of the moving contacts of the switch means under the control of the amplifier A1 and relay RL1 provided that the circuit is functioning correctly. These contact steps 7 and 8 on S4 thus energise the driving coil of the switch S4 when they are connected to the appropriate contacts RL1 so that before the relay S4 can complete its operating cycle the relay RL1 must change first in one direction and then in the reverse direction in response to the alternating unbalance which is introduced into the network by the resistances R11 and R12. This arrangement ensures that S4 cannot complete its cycle unless the network is correctly balanced to the nearest unit and the amplifier has the minimum sensitivity required. The failure of the relay to complete its cycle may be employed in any convenient manner to prevent the printing or other subsequent operations or to provide an audible or visual alarm.

In the illustrated circuit potentiometers P2 and P3 are provided for zero setting and for range control in the calibration of the compared output voltages derived from R14 and P1. The resistance R13 is incorporated to produce the biasing voltage from a current flowing through resistance R11.

Preferably the transformer T1 comprises a toroidal core with high magnetic efficiency and low leakage reactance in order to provide good regulation and low phase shift.

It will be appreciated that the system may be used for example for controlling the feed of a batch of material of predetermined weight by presetting the stepping switches S1, S2 and S3 to the selected batch weight and utilising the amplifier to detect when the scale potentiometer P1 reaches balance, the relay RL1 under the control of the amplifier being arranged to control the flow of material to the weighing machine.

The system hereinbefore described provides the following advantages:

Firstly, the transformer T1 can be made commercially with tappings giving increments of voltage more accurate than are obtainable from resistive dividing networks but at a comparable cost. Secondly the output voltages from the transformers are substantially independent of temperature or ageing effects. Thirdly, one transformer, provided its regulation is sufficiently good, may replace several resistive dividers, with resulting economy and consistency of ratios for the various decades.

I claim:

1. In a weighing apparatus, means for producing a voltage proportional to a load, means for producing counter voltage increments in each of a plurality of orders of measurement corresponding respectively with different units of weight, a plurality of stepping switches associated one with each of the orders of measurement and operable to determine the value of the counter voltages provided in the respective orders; each of said stepping switches comprising a moving contact scanning a plurality of fixed contacts, amplifier means connected to compare said load proportionate voltage and counter voltage, switch means connected to the output of said amplifier to respond to a change in the result of said comparison, and a governing stepping switch under the control of said switch means and operable to control the sequential setting of the stepping switches identified with the plurality of measuring orders to render the latter switches operable to automatically balance the load proportionate and counter voltages; said counter voltage productive means comprising a transformer having a secondary winding including a plurality of tappings providing a plurality of equal voltage increments, said tappings being directly connected to the corresponding fixed contacts of each of said counter voltage stepping switches, and attenuators connected between moving contacts of the counter voltage stepping switches and amplifier so that the attenuators proportion the voltage derived from the moving contacts according to the relative values of the plurality of measurement orders.

2. Weighing apparatus according to claim 1 incorporating biasing means introduced by the governing stepping switch to increase the counter voltage during the setting of each stepping switch identified with the plurality of order of measurement by an amount equal to one increment of that order being adjusted thereby to exceed the load proportionate voltage when the stepping switch identified with that order provides a number of voltage increments corresponding to the appropriate number of weight units in that order.

3. Weighing apparatus according to claim 2 wherein said biasing means comprises a plurality of resistances identified one with each order of measurement, fed by the voltage between two tappings of the transformer, and sequentially introduced during the sequence of adjustment of the stepping switches identified with the plurality of measuring orders.

4. Weighing apparatus according to claim 3 wherein the governing stepping switch incorporates voltage productive means introduced after the completion of the setting of the plurality of stepping switches identified with the plurality of orders of measurement so as to successively unbalance the load proportionate and counter voltages in two opposite senses, the governing switch being dependent on the operation of the switch means arising from said unbalancing in order to complete its operating cycle thereby to check the correct operation of the system.

5. Weighing apparatus according to claim 4 wherein said voltage productive means comprises resistances fed by the voltage between two tappings of the transformer.

References Cited in the file of this patent

UNITED STATES PATENTS

| | | |
|---|---|---|
| 2,938,701 | Thorsson et al. | May 31, 1960 |
| 3,030,569 | Chilton | Apr. 17, 1962 |